United States Patent [19]

Duane, Jr.

[11] Patent Number: 4,544,578
[45] Date of Patent: Oct. 1, 1985

[54] METHOD OF TOUCHING UP SURFACE-BLEMISHED MATT-FINISHED SURFACE GRAINED COLORED MOLDED PLASTIC PARTS

[75] Inventor: George P. Duane, Jr., Winchester, Va.

[73] Assignee: Chem-Pak, Inc., Winchester, Va.

[21] Appl. No.: 555,634

[22] Filed: Nov. 23, 1983

[51] Int. Cl.$^4$ .................... B05D 5/00; B32B 35/00; B29H 5/06; B29H 5/16
[52] U.S. Cl. .................... 427/140; 264/36; 264/340; 264/341; 427/161
[58] Field of Search .............. 427/140, 161, 421; 264/129, 340, 341, 36

[56] References Cited

U.S. PATENT DOCUMENTS

| | | | |
|---|---|---|---|
| 3,485,662 | 12/1969 | Metevia | 427/140 |
| 4,247,580 | 1/1981 | Chao | 264/341 X |
| 4,332,861 | 6/1982 | Franz et al. | 427/161 X |

*Primary Examiner*—Michael R. Lusignan
*Attorney, Agent, or Firm*—Mason, Fenwick & Lawrence

[57] ABSTRACT

Surface finish blemishes in "color coded" surface grained parts injection molded from colored plastic can be removed by spraying the blemished surface area of the part with a sprayable mixture comprised of (a) a substantially non-yellowing, solvent-soluble generally transparent, binder resin in the amount of about 2–10%, (b) a finely divided flatting pigment which is generally transparent when suspended in said resin, the amount of said pigment being about 0.4–1%, and (c) about 90–95% of a volatile solvent medium effective to dissolve said resin without destroying the surface grain of the part when sprayed thereon, thereby to cover the blemished area with at least one coating of a transparent, matt-surfaced solid film of flatting pigment dispersed in said resin which coating blends substantially completely uniformly with the original matt finish of said part. Where the part is molded of a plastic which is solvent-resistant such as polyethylene or polypropylene, a chlorinated polyolefin resin is added in the amount of about 0.2–2% and sufficient to promote adhesion to said surface, such polyolefin resin being compatible with said binder resin and soluble in said solvent medium at least prior to evaporation of the latter.

8 Claims, No Drawings

METHOD OF TOUCHING UP SURFACE-BLEMISHED MATT-FINISHED SURFACE GRAINED COLORED MOLDED PLASTIC PARTS

FIELD OF THE INVENTION

This invention relates to the field of injection molded plastic parts and is concerned more particularly with a method for touching up or removing surface blemishes on such parts molded with a grained surface having a matt or flat finish, without the necessity for completely top-coating the same.

BACKGROUND OF THE INVENTION

Increasingly in many industries, parts formerly made of metal or wood are molded from plastics. This trend is especially strong in the automobile industry where due to the increasing emphasis on the reduction of body weight to improve operating efficiency and reduce cost, an increasing variety of components or parts of the automobile are being molded from plastics. Among the parts made in this way are those suited for the interior trim such as door and window trim elements, door panels, dashboard panels, steering columns and transmission housings, and armrests, for example, and quite recently this trend is even being extended to exterior trim components.

In addition to the automotive industry, cabinets and housings for televisions, various items of electronic equipment, and industrial equipment are produced in this manner.

In many if not most instances, a preference exists for a matt or flat finish on the grain-finished parts or components in question for various reasons, including a reduction in light reflection which can be objectionable in certain locations and better durability since a glossy finish is more susceptible to damage by scratching or abrasion which may be hardly noticeable on a roughened or matt-finish surface. Generally, these parts and components are molded by injection molding which can now be satisfactorily carried out even for relatively large objects, and in order to impart to the molded product the desired finish, the interior surface of the mold is first grained or pebbled to create a pattern generally of peaks and valleys and the grained surface is then treated to roughen the surfaces of the individual peaks and valleys and create the desired degree of mattness or flatness. Such treatment can be done in several known different ways, e.g., by sand-blasting with the size of the grit being selected as needed or by reducing the severity of an excessive initial degree of roughness to a desired extent by a kind of "bead peening" with glass beads of the required size.

In the injection molding of such matt-finished parts and components, however, it becomes virtually impossible to achieve consistently a matt-finished product free of visible defects, particularly where the part being molded is large, such as door panels, door post covers, dashboard panels and the like. Such defects can take a variety of different forms such as so-called "water marks", formed by water droplets condensed in the mold during cooling after the previous injection, "flow lines" caused by temporary discontinuities in the plastic flow through the mold, glossy spots, lines or off gloss areas, etc., all of which are manifested as a visible blemish in the otherwise generally uniform matt finish over the exterior surface of these grained parts. In addition, the mold surface may not be uniform around so-called "knock-out pins" or defined openings in the mold, while the mold surface itself with repeated use undergoes wear at particular points, creating surface irregularities. Such surface blemishes are, of course, objectionable under the standards of the manufacturer of the final product using such parts, giving the impression to the customer of poor quality and shoddy workmanship, and the industry has been faced with the alternatives of either discarding these defective parts or else applying a surface coating over the entirety of the exposed surface of the defective parts so as to obliterate or conceal the defect. The practice in the latter case has been to provide a full-scale spray paint booth wherein the entire surface of the defective part is sprayed, often after application of a prime coating, with a coating pigmented to a color corresponding to that of the "color-coded" part in question. Each manufacturer usually has a set of standard colors or "color codes" which can be matched by the bulk supplier of the pigmented plastic to be molded or by other suppliers, and the parts are molded to match these colors, being referred to in the art as "color coded". Plastics, such as the polyolefins, e.g., polyethylene and polypropylene, are notoriously difficult to coat due to their recognized resistance to virtually all common solvents except under extreme conditions, and consequently, the application of a prime coat has been virtually essential to insure proper adhesion of the ultimate top coating, the latter being formulated to provide a flat or matt effect following the well developed principles of paint formulation. On the other hand, ABS for example by nature finishes too "glossy" to meet the current gloss standards of the automotive industry.

The provision of paint booths with their accessory equipment involves a substantial capital investment and a variety of top coating formulations must be kept in stock to allow for matching with the variously color-coded parts or components. The treatment of the blemished and unacceptable parts and components in this fashion thus adds materially to the ultimate cost of their production, and it would be desirable if there were available a less complicated and expensive technique for restoring surface blemished matt-finished grained molded color-coded plastic parts to an acceptable appearance.

SUMMARY OF THE INVENTION

In accordance with the present invention, matt-finished or flat-finished parts of color-coded plastic, which are superficially marred with defects or blemishes in the matt surface, which appear usually as excessive glossiness but occasionally as excessive flatness, can be touched up and restored to virtually visually perfect appearance by the application by spraying of a coating composition formulated to create a substantially transparent coating having a matt or flat surface finish which effectively covers only the blemished areas without visibly altering the appearance of the properly finished areas of the piece. Obviously, the touching up of isolated blemished areas of an overall piece, which areas may appear as spots ranging in size from about ⅛ inch to 1 inch in diameter or lines up to 1 inch in width extending across an entire piece, cannot possibly be so precisely controlled under practical circumstances as to confine the touch up spray to the blemished area alone. Necessarily, some overlap of the sprayed coating with the properly surfaced regions of the piece will occur. Surprisingly, the touch-up formulation of the present invention has no apparent affect on the appearance of the properly surfaced regions of the piece, blending in virtually perfectly with the original finish of the plastic so that such surface appears for all intents and purposes unchanged. In the defective or blemished regions, however, the surface is effectively brought to the desired mattness or roughness matching the remainder of the piece. Moreover, despite its matt finish, the invention results in a transparent coating so that a single composition can be applied to parts of a considerable diversity of coloration without the necessity for individually tinging corresponding to the specific color coding for each part.

GENERAL DESCRIPTION OF THE INVENTION

Broadly speaking, the invention involves the touching up by spraying with a coating formulation composed of a resinous film-forming or binder component, which dries to an at least substantially transparent, i.e., water-clear, state, a volatile solvent medium for such resinous component and a finely divided flatting pigment which is at least substantially transparent when dispersed within the dried resin. This formulation can be packaged in aerosol form in small containers including a pressurized propellant medium or, alternatively, it can be formulated for application by other spraying techniques, for intance, conventional compressed air sprayers including a venturi aspirator, a hydraulic sprayer expelling the liquid by direct hydraulic pressure, electrostatic sprayers and others. However, individual aerosol containers have the important advantage of cheapness, simplicity and convenience, enabling the operator at each individual injection molding station to carry out the touch up operation immediately as each part is ejected from its mold and inspected with a minimum of expense and without the need for further equipment of manipulative operations.

At least for parts molded of solvent resistant plastics, typified by the polyolefins, e.g. polyethylene and polypropylene, the resin component should consist of two distinct polymeric constituents, one constituting the substantial bulk of the resin component, i.e., about 75-95% of that component, and serving as the film-forming carrier-binder for the pigment and the other making up the balance of about 25-5% and functioning to promote adhesion, needed for these plastics. It appears that a wide choice of resins is available for use as the binder constituent, the essential requirements for which are at least substantial transparency upon drying, freedom from yellowing with age, a reasonable degree of binder integrity for holding the flatting pigment in place, and substantial compatibility with the adhesion-promoting resin when present. Thus, virtually any of the acrylic, cellulosic, alkyl, vinyl and like resins which satisfy these criteria are acceptable in principle for this constituent. It has been found in actual practice that acrylic resins are particularly effective, exhibiting a strong resistance to yellowing even after considerable periods of exposure to daylight and the atmosphere and providing a good durable binder. Virtually any of the acrylic resins which have the requisite transparency are suitable and of these a methylmethacrylate copolymer with 2-ethyl hexyl acrylate has been found to be most preferred. Other resins of this type that have proven particularly satisfactory include n- and iso-butyl methacrylate, methyl n-butyl methacrylate copolymer with ethyl methacrylate and methacrylate copolymer with ethyl acrylate. These and other acrylic resins are sold by the du Pont company under the tradmark "ELVACITE", the most preferred methylmethacrylate copolymer being designated for instance as Elvacite 2014. A helpful description of such resins, which differ fundamentally for present purposes only as to hardness and intrinsic viscosity, and their formulation for a variety of purposes, can be found in a technical bulletin published by the du Pont company under the title ""ELVACITE" Acrylic Resins" No. E-23429 published 12/78.

With solvent resistant plastic substrates the binder resin alone, even when constituted by one of the preferred acrylate resins identified above, does not have sufficient adherence to give fully satisfactory results in practice; and consequently, an adhesion promoting polymer needs to be incorporated when working with plastics of this type. The adhesion promoting polymer is a chlorinated polyolefin, such as chlorinated polyethylene having a degree of chlorination which is sufficient to impart adherence to the inert substrate, say about 25-30%, or, more preferably, chlorinated polypropylene containing 26% chlorine and modified with acid to be emulsifiable.

Only a small amount of the adhesion promoting chlorinated polyolefin has been found necessary, an effective range being of about 0.2-2% by weight of the total formulation as applied; whereas the content of the binder resin can range between about 2% to 10% for the total formulation. Obviously, these concentration values presuppose the presence in the formulation of the full amount of solvent required for effective application; and while it is preferred that all of the solvent be incorporated at the time of formulation, this is not essential. Thus, to reduce weight for purposes of transportation, etc., it is entirely feasible to supply the composition of the invention in a more concentrated form subject to further dilution at the ultimate point and time of application; and under such circumstances, the content of resin solids in the concentrate can exceed the above limits, perhaps up to a total of 35% total solids.

As with any sprayable liquid, the viscosity of the present mixture is a limiting factor and the proportion of resin solids and other solids must be controlled so as to achieve a viscosity in the ultimate product that is sprayable with relative ease and which provides appropriate characteristics to the wet coated piece.

As already indicated, within the resin mixture alone the chlorinated polyolefin is utilized in a minor proportion, say in the range of about 5-25%, while the compatible binder resin constitutes the major proportion of the resin mixture, i.e., in the range of about 75-95%, on a dry solids basis. In selecting these values, attention must be paid to the fact that the chlorinated polyolefin is normally sold in solution form, the actual resin solids making up only a part of the product weight. For example, one effective chlorinated polyolefin available under the designation 343-3 from Eastman Chemical Products Company is supplied on a 25% solids basis in xylene.

Other plastics commonly used for molding grained auto and like parts, such as ABS, are relatively soluble in common volatile solvents and thus present no problem as regards film adhesion and for this type of plastic, the inclusion of the chlorinated polyolefin is unnecessary.

In order to impart to the touched up surface the desired matt or flat finish, a small proportion of a transparent flatting pigment in finely divided form forms an essential component of the inventive mixture. In general the flatting pigments effective here will generally be selected from the class of pigments known as "extender pigments" in the paint field, although not all extender pigments exhibit desirable flatting properties. The most important properties of these pigments that influence their flatting quality is particle size and shape and capacity to absorb and/or become swollen in the resin in which they are suspended. The matt or flatting effect in the coating is dependent upon the presence of the pigment particles at the surface of the film in a position projecting at least slightly above the plane of that surface so as to diffuse reflected light. This behavior requires that the pigment particles have good absorptivity for the resin since otherwise they would be submerged below a continuous smooth surface of the resin film, resulting in a glossy surface, and the size of the particles must likewise be such as to avoid complete immersion within the resin film. The apparent gelling of these swollen particles provide an irregular surface reflecting light in various planes thus producing the flatted effect.

As initially stated, the pigment particles must be transparent, but this denotes the appearance of the pigment in the environment of the resin film, not its appearance in air. Transparency or opacity of pigment particles in a resin film depends upon the relative refractive indexes of the pigment particles and the resin combined. Particles suitable for the present invention have a refractive index roughly similar to the refractive index of the usual resins which is around 1.4–1.5. However, when the pigment particles are in a dry state surrounded by air, which has a refractive index of 1, they appear to be opaque and generally white. This emphasizes an important characteristic of the present formulation; namely, that the matt finish it produces does not depend upon opacity, covering or hiding power, or coloration of the dispersed pigment particles, but rather upon the creation of a random irregular surface on the coating caused by the transparent pigment particles projecting above the normal film surface, so that the light reflecting from the surface is diffused, giving a dull flat appearance rather than a slick, shiny gloss.

The selection of specific flatting pigments will pose no difficulty to those skilled in the formulation of paints and coatings, and mention can be made in this connection of various types of silica flatting pigments both of natural origin as for example diatomaceous silica as well as chemically prepared such as silica hydrogen produced under the trade name Santocel by Monsanto Chemical Company, and pyrogenic silica produced under the trade name Cab-O-Sil by Godfrey L. Cabot, Inc. Other types of pigments known to have flatting properties include certain forms of calcium carbonate such as whiting, magnesium carbonate, calcium metasilicate such as is sold under the trade name Wollastonite, some clays, bentonite and so on. Usually, these materials are available in a range of particle sizes and the particle size should be one that gives the desired degree of matt finish. Some of these pigments have a more or less fibrous or acicular configuration which is generally desirable in promoting surface irregularities in the final film.

A flatting pigment found particularly effective in the present invention is that sold under the trade name LO-VEL 27 by PPG Industries. This product is an amorphous synthetic silica composed predominantly, i.e., in excess of 95% on a dry weight basis, of silicon dioxide with very small amounts in the order of 0.1–0.6 of the oxide of metals and alkaline earth metals, such as iron, aluminum, titanium, calcium and magnesium with a percent or so of salts such as sodium chloride or sodium sulfate. This material has an ultimate particle size of 0.021 microns with a medium glomerate size of about 4 microns, it has a high oil absorbency and a refractive index of 1.455.

The content of the flatting pigment need be relatively small, say in the range of about 0.4–1% of the total formulation, including the solvent medium, or about say 2–3 to 20% of the coating solids alone. Within this range, the specific value selected will depend upon the extent of flatness that is desired which, as suggested initially, may vary perceptibly from one molded part to another or between parts of different suppliers, dependent upon aesthetic considerations of the environment in which the part is to appear.

The resin component, as defined above, plus the flatting pigment constitute the essential solids of the present formulation and can make up to about 20%, and more usually about 6–12%, of the total formulation ready for application. At solids concentrations exceeding about 15%, the viscosity of the overall mixture becomes excessively high for easy spraying by conventional spraying devices. Maximum solid, however, may be tolerated by the choice of resins selected for their low viscosity characteristics, such as Elvacite 2013.

The solvent medium employed for dissolving the resin component is not critical and can vary widely within the broad range of solvents which are available. Obviously, the solvent must have an effective dissolving capacity for the resin, although a special word of explanation is necessary on this point with regard to the chlorinated polyolefin resin when present. The latter resin tends to have a peculiar behavior in typical organic solvents, becoming less soluble with increasing dilution, unlike most resins which become more soluble as their concentration is reduced. That is, the resin tolerates the solvent up to certain levels or ratios but above such levels, the resin tends to go out of solution. This peculiar behavior causes no difficulty in the formulation of the present composition even though a considerable content of solvent is normally employed for dissolving the binder resin and dispersing the flatting pigment. At such higher solvent concentration, the chlorinated polyolefin resin may appear in the formulation as a dispersion or suspension, but as the solvent system dissipates during drying of the coating, the olefin resin particles then go back into solution as the solvent concentration drops into the range of tolerance of the resin so that well before the coating has dried, both the olefin and binder resin have become fully dissolved and upon drying form a continuous film with the flatting pigment dispersed uniformly therein.

In this connection, it should be noted that for compositions of this invention intended specifically for application to ABS and like plastic substrates, while the presence of a chlorinated polyolefin is not essential for good film adhesion, the inclusion of this additional resin component is not objectionable and can serve a useful practical purpose. Thus, if the operator should carelessly or erroneously select such a formulation for use with polyethylene or polypropylene or like substrates, acceptable results would nonetheless be attained which would not otherwise be true.

As noted, there are many solvents that are in principle applicable to the present system, and no attempt will be made here to list more than a few of these since their choice will be heavily influenced by the type of binder resin that is utilized and other factors. For the preferred acrylate binder resins, such chlorinated hydrocarbon solvents as methylene and ethylene dichloride, aromatic solvents such as xylene and toluene, ketones such as acetone, methyl ethyl ketones, and methyl isobutyl ketone, esters such as the lower alkyl acetates are useful. Many acrylate resins are not, on the other hand, soluble in various alcohols or any of the various alkyl hydrocarbon solvents. A summary of the solubility in many different resins is given in the above-identified du Pont technical bulletin in Table 5 on pages 8 and 9 thereof. However, it does not follow that solvents which in themselves are ineffective cannot be used here in admixture with other effective solvents. Where a particular active solvent, such as methylene chloride is present in considerable amounts, minor amounts of liquids which are non-solvents per se, such as isopropyl alcohol and VM and P naptha, can be included and may be desirable under some conditions. Alternatively, the resin components can many times be varied to better tolerate these relatively poor solvents.

As is well recognized in the coatings field, the various available organic solvents have rather widely varying evaporation rates, usually measured relative to n-butyl acetate, the ratings for a number of common solvents being set forth in Table 3 of the above-identified du Pont technical bulletin, and the evaporation rate is necessarily an important factor in preparing a useful product. The coating formulation must wet the surface to be coated, irrespective of the type of plastic substrate, and the resins must at some point before drying be fully dissolved within the coating in order for effective adherence and leveling of the coating to take place as desired and the solvent evaporation rate controls this behavior. However, it is possible to in principle compensate for variations in solvent rate by other means, such as the distance separating the spray nozzle from the substrate to be coated as well as the particle size of the sprayed particles. For example, if methylene chloride were to be used solely as the solvent medium in a formulation for solvent-resistant substrates, the very high evaporation rate of this solvent would necessitate holding the spray nozzle very close to the surface and perhaps additionally using a spray nozzle giving fairly coarse spray so as to prevent the spray particles from undergoing substantial drying prior to their contact with the substrate.

While such compensation may be ordinarily possible, it is strongly preferred to employ a combination of solvents which can be tailored so as to achieve the combination of solvent properties that is most effective in practice. No hard and fast rule can be set down for selecting the optimum combination for a specific situation but generally speaking it is advantageous to join together solvents of different ranges of evaporation rates. Thus, there might be present about 5–60% of a very volatile solvent having an evaporation rate of at least about 500–600, about 5–40% of a medium boiling solvent with with an evaporation rate between say about 70 and 500–600, and about 1–10% of a poorly volatile solvent having an evaporation rate below about 70, and preferably not more than about 40. Some consideration should be given in this connection to the current tendency to restrict the permissible concentration of vapors of certain solvents, especially those of the aromatic type, in the working environment for health reasons, and consequently, the content of this type of solvent should preferably not exceed about 10% of the total composition so as to hold its vapor concentration in the ambient atmosphere after spraying within tolerable limits, unless means, such as positive ventilation is available to remove the solvent vapors.

It is definitely preferred to formulate the solvent medium so as to control the drying rate particularly in the final stage or "tail" of the drying cycle. The resin component, particularly the binder resin, has some tendency when the drying rate is too high at the end of the drying cycle to precipitate as crystals or encapsulated water which give an undesirable opaque whitish aspect to the coating, known as "blooming". The usually accepted cause of blooming is the trapping or encapsulation in the dried film of moisture which is condensed from the atmosphere by the chilling of the film resulting from rapid evaporation of solvent or otherwise present in the wet film. This tendency toward blooming can normally be controlled by incorporating, as noted above, small amounts of solvent having a relatively low evaporating rate and with little or no water solubility to act as a "tailing solvent", insuring the presence of some effective solvent up to the point of complete film dryness and thereby avoiding premature resin precipitation or other undesirable surface conditions. Examples of useful tailing solvents include "Cellosolve", ethylene glycol ethers, n-butylacetate and methyl amyl ketone. The "tailing solvent" must, of course, have active solvency for the resin component to achieve its intended function. Mixtures of several different tailing solvents within the above indicated limits may be desirable.

The presence of a hygroscopic solvent should be avoided, if possible, or at least the proportion thereof held to a minimum, to increase the tolerance of the system to high humidity conditions. Under such conditions, water can be adsorbed at the coating surface, producing a whitish aspect from "blooming" of the resin mentioned above. For the same reason, care should be exercised insofar as possible to exclude water from the ingredients of the instant formulation. One example in this connection is acetone which is a relatively strong hygroscope. The complete avoidance of water in the acetone of commerce is difficult if not impossible, but certainly the acetone should not be deliberately handled so as to be exposed to the atmosphere or otherwise to unnecessarily increase its moisture content.

The above ranges of proportions of the solvents of varying evaporability are by weight of the total formulation. As already inferred, the solvent medium, whether made up of one or several solvents, can equal about 85–90% of the formulation.

In addition to the above general discussion concerning the solvent component of the invention, certain peculiar factors should be added in the case of formulation intended for ABS and like substrates. In contrast to solvent resistant olefin substrates, ABS and similar plastics are sensitive to highly active solvents and for this type of substrate one must insure that the activity and amount of solvent applied thereto to wet its surface does not soften the plastic to the point of degrading its original surface grain, which would be more harmful than any benefit conferred by the invention. Hence, for these substrates, the concentration of highly active solvents should be limited or else compensated for by increasing the spraying separation and thus the evaporation of such solvent. Within these restrictions, however, some active solvent may be desirable in the product from the standpoint of satisfying environmental regulations specifying the maximum allowable limits of solvent in the ambient atmosphere of the work area and in balancing the low evaporation rate of less active solvents. For example, methylene chloride has much higher permissible atmospheric concentrations than VM and P naptha and can usefully be combined therewith to affect the adverse atmospheric effects of the latter.

The preferred practice of the invention is to package the formulation composed as described above in an aerosol container, and in that event an aerosol propellant needs to be included in an amount which can vary between about 15–50% by weight of the remainder of the formulation. Any suitable aerosol propellant can be employed including a liquified hydrocarbon gas such as liquified propane gas, mixtures of liquified propane and butane, dimethyl ether as well as any of the fluorocarbons, bearing in mind that governmental restrictions are presently enforced against the use of the latter without specific permission. It is not necessary that the propellant exert solvent action for the resin component although this is not objectionable and the propellant can be miscible with the solvent medium without complications since the propellant evaporates immediately upon release from the container. On the other hand, where the composition is to be applied as an aerosol in air, aspirated, for example, by means of a venturi, or by direct piston ejection, the inclusion of a propellant would be superfluous.

As used herein, the term "grained" is meant in a broad sense, to include not only patterns of intersecting grooves or the like but also a textured appearance similar to leather or orange peel. For such textured substrates especially, it may be advantageous to include a fluorocarbon surface active agent to reduce the coarseness of the "orange peel" effect. Various agents of this kind could be used and a particularly effective one is available from Minnesota Mining and Manufacturing Co. under the trade name "Flo-rad 431".

The temperature of the part of the time of touching up will influence the drying rate of the applied film. Ideally the present formulation is designed for application at each individual injection molding station, being applied to the necessary parts promptly after their removal from the injection mold and while in still relatively hot condition. While desirable, this practice is not critical and, if preferred, the parts could be collected from a number of molding stations, inspected one by one and touched up as needed, at which time the parts would be at ambient temperature. Drying of the coating under the latter conditions could be accelerated if need be by heat sources or adjustments could be made in the make-up of the solvent medium to insure an adequate drying rate at the lower temperature.

The composition of this invention is suitable for removing surface finish blemishes in matt-finished colorcoded, grained parts only. It is not designed to correct structural defects such as non-homogeneous blending of color pigment within the polypropylene molding material or the like.

The practical execution of the present invention will be further understood from the following working examples.

EXAMPLE I

An aerosol formulation was prepared by mixing together the following ingredients in the following proportions by weight:

| | % by weight |
|---|---|
| Active Ingredient | |
| Methacrylate copolymer resin solids "Elvacite" 2014 (du Pont) | 5.2 |
| Chlorinated polyolefin resin solids (25% solids in xylene) 343-3 (Eastman Chem) | 0.4 |
| Colloidal silica solids - LO-VEL 24 (PPG) | 0.8 |
| Xylene (including solvent from polyolefin) (70)[1] | 11.0 |
| Methylene chloride (2750) | 34.0 |
| Acetone (1160) | 21.6 |
| Cyclohexanone (23) | 3.0 |
| "Cellosolve" glycol ethyl ether (32) | 3.0 |
| Fragrance (optional) | trace |
| Total Active Ingredients | 79.0 |
| Propellant | |
| Liquified Propane Gas (LPG) | 21.0 |
| Total Formulation | 100.0 |

[1]number in parentheses denotes evaporation rate relative to n-butyl acetate (= 100)

The methylmethacrylate copolymer resin was initially dissolved in the methylene chloride after which the xylene and chlorinated polyolefin were admixed and combined with the initial solution. Then the acetone was added followed by the colloidal silica and finally the cyclohexanone and "Cellosolve". This product was loaded into standard aerosol dispenser containers equipped with standard valves and spray tops and was used for touching up the matt-blemished areas of a variety of injection molded polypropylene auto parts of various colors and relatively deep matt finish by spraying the formulation over the blemished areas with a side-to-side sweeping motion at a distance of 8–10 inches from the part surface promptly upon their removal from the mold and while still hot. Coverage of the various defects was excellent, particularly for parts of relatively light colored pigmentation where the touched up initially blemished areas were undistinguishable from the untreated regions with only casual application. On pieces of deep color, i.e., blacks, dark blues, dark reds, browns, and the like, somewhat greater care and attention was needed to achieve a good match, i.e., further inspection after initial application and follow-up applications sometimes are needed, but with the exercise of this care virtually the same improvement was readily achievable. Some tendency to blooming was noticeable under extreme summer heat and humidity.

EXAMPLE II

Example I was repeated with the content of silica reduced to 0.5 to lessen the depth of the matt flatness. This product was applied in the same way to parts having a finish approaching semi-flat with the same results.

EXAMPLE III

To use under conditions of high temperature and humidity comparable to severe summer conditions with a minimized tendency to blooming due to such humidity, the following formulation was prepared and used as in Example I.

| Active Ingredient | % by weight |
|---|---|
| Methacrylate copolymer "Elvacite" 2014 | 5.5 |
| Chlorinated polypropylene - Eastman Chem 343-3 | 0.4 |
| Flatting pigment - LO-VEL colloidal silica | 0.5–0.8[1] |
| Xylene (70) | 11.0 |
| VM & P Naptha (120) | 16.5 |

| Active Ingredient | % by weight |
|---|---|
| Methylene chloride (2750) | 36.8 |
| Methyl amyl ketone (30) | 6.0 |
| Fragrance (optional) | |
| Total Active Ingredients | 76.7 |
| Propellant - LPG | 23-23.3% |
| Total Formulation | 100.0 |

[1] Dependent upon desired extent of flatness

This formulation when sprayed on polypropylene parts of various kinds a few seconds after removal from the injection mold gave good results under severe summer conditions with virtually no occurrence of blooming.

EXAMPLE IV

The following formulation was prepared particularly for use with parts molded from ABS although it is likewise effective with parts molded from polyethylene or polypropylene.

| | % by weight |
|---|---|
| Active Ingredient | |
| Isobutyl methacrylate - "Elvacite" 2045 | 6.0 |
| Flatting pigment LO-VEL 27 | 0.4-1.25[1] |
| Fluorocarbon surfactant - Flo-Rad 431-3M | 0.08 |
| Chlorinated polyolefin - Eastman Chem 343-3 | 1.0 |
| Xylene | 5.0 |
| Methylene chloride | 20.0 |
| VM & P Naptha | 42.4 |
| Fragrance - optional | .001 |
| Total Active Ingredients | 74.5-75.4 |
| Propellant | |
| Liquified propane-butaine mixture | 25.0 |
| Total Ca. | 100.0 |

[1] Varies with degree of flatness desired

This formulation gives excellent results in restoring blemished parts of ABS but by virtue of its content of chlorinated polyolefin is also acceptable for treating parts of polyethylene and polypropylene if inadvertently or even deliberately applied to the latter. If use is to be confined exclusively to parts of ABS, the chlorinated polyolefin can be omitted without significantly influencing the results obtained with ABS parts, the amount of methylene chloride and/or VM & P naptha being adjusted to make up the difference.

What is claimed is:

1. A method of removing surface finish blemishes in matt-finished injected molded color-coded, grained plastic parts, which comprises spraying the surface area of said part containing such blemishes with a sprayable mixture comprised of (a) a resin component consisting essentially of a substantially nonyellowing, solvent-soluble substantially transparent, binder resin which comprises an acrylic resin, (b) a finely divided flatting pigment which is substantially transparent when in said resin component, the amount of said pigment being about 0.4-1%, and (c) about 85-95% of a volatile solvent medium effective to dissolve said resin component at least before the evaporation thereof and upon spraying on said surface area of said part to wet the same without significantly softening that surface area and thereby degrading the grained finish thereof, thereby to cover the blemished area with at least one coating of a transparent, matt-surfaced solid film of flatting pigment dispersed in said resin component and blending substantially uniformly with the original matt surface finish of said part, all percentages being by weight of the total mixture.

2. The method of claim 1 wherein said resin component also includes about 0.2-2% of a chlorinated polyolefin resin and sufficient to promote the adhesion of said binder resin to said surface, said chlorinated polyolefin resin being compatible with said binder resin and consisting about 5-25% of said resin component with said binder resin consisting about 75-95% thereof.

3. The method of claim 1 wherein said mixture is sprayed as an aerosol under the pressure of a liquefied normally gaseous propellant associated therewith.

4. The method of claim 1 wherein said solvent medium is a mixture of at least one of each of a highly volatile solvent, a moderately volatile solvent, and a lowly volatile solvent to inhibit blooming of said coating.

5. The method of claim 4 wherein said solvents are present in the following respective ranges by weight of the total mixture
highly volatile—about 5-60%
moderately volatile—about 5-40%
lowly volatile—about 1-10%.

6. The method of claim 1 wherein said flatting pigment is silica pigment.

7. A method of removing surface finish blemishes in matt-finished injected molded color-coded, grained plastic parts molded from solvent-resistant polyolefin plastic, which comprises spraying the surface area of said part containing such blemishes with a sprayable mixture of (a) a finely divided flatting pigment in the amount of about 0.4-1.0%, (b) a resin component for adhering said pigment to said surface consisting essentially of a substantially nonyellowing, solvent-soluble substantially transparent, binder resin, said pigment being substantially transparent when in said resin component, and (c) about 85-95% of a volatile solvent medium effective to dissolve said resin component at least before the evaporation thereof and upon spraying on said surface area of said part to wet the same without significantly softening that surface area and thereby degrading the grained finish thereof, thereby to cover the blemished area with at least one coating of a transparent, matt-surfaced solid film of flatting pigment dispersed in said resin component and blending substantially uniformly with the original matt surface finish of said part, all percentages being by weight of the total mixture.

8. The method of claim 7 wherein said resin component consists essentially of an acrylic binder resin and about 0.2-2% of a chlorinated polyolefin resin, the amount of said chlorinated polyolefin resin being sufficient to promote adhesion of said acrylic binder resin to said polyolefin plastic surface, said chlorinated polyolefin resin being compatible with said binder resin and consisting about 5-25% of said resin component with said binder resin consisting about 75-95% thereof.

* * * * *